United States Patent [19]

Kay

[11] 4,216,126

[45] Aug. 5, 1980

[54] ACCELERATED RUBBER COMPOSITION

[75] Inventor: Edward L. Kay, Akron, Ohio

[73] Assignee: The Firestone Tire & Rubber Company, Akron, Ohio

[21] Appl. No.: 946,911

[22] Filed: Sep. 28, 1978

[51] Int. Cl.$^2$ .......................... C08F 8/32; C08L 7/00; C08K 5/17

[52] U.S. Cl. ........................................ 260/5; 260/2.3; 260/798; 525/341; 525/194; 525/333; 525/354; 525/474; 525/537; 525/535

[58] Field of Search ....................... 526/28; 260/5, 798

[56] References Cited

U.S. PATENT DOCUMENTS

| | | | |
|---|---|---|---|
| 3,494,900 | 2/1970 | Morita et al. | 526/28 |
| 3,496,152 | 2/1970 | Morita et al. | 526/28 |
| 3,544,531 | 12/1970 | Morita et al. | 526/28 |
| 3,865,781 | 2/1975 | Lohr et al. | 526/28 |
| 3,867,358 | 2/1975 | Trivette et al. | 526/28 |
| 3,969,349 | 7/1976 | Trivette et al. | 526/28 |
| 4,065,443 | 12/1977 | Campbell et al. | 526/28 |

FOREIGN PATENT DOCUMENTS 1942973  3/1971  Fed. Rep. of Germany ............. 526/28

*Primary Examiner*—William F. Hamrock

[57] ABSTRACT

The vulcanization rate of rubber stock compounded for curing is increased by using in the stock for the cure an accelerator of certain amine-substituted esters of phosphorodithioic acid.

13 Claims, No Drawings

ACCELERATED RUBBER COMPOSITION

BACKGROUND OF THE INVENTION

There exist many known accelerator agents and systems for the curing and vulcanization of rubber(s) of either the natural or synthetic variety (and mixtures thereof) which are compounded for that purpose. These include various and numerous sulfur-containing materials, as are all set forth in the *VANDERBILT Rubber Handbook*, the Current Edition and which are knwon for such usage when employed individually or in combination with other materials.

Unfortunately, the great preponderance of satisfactory accelerator materials tend to be undesirably expensive. As is abundantly evident in the ensuing Specification, the accelerator ingredients employed in practice of the present invention are obtainable and providable by a relatively simple process utilizing generally readily available and relatively low cost starting raw materials.

The prior art in this particular area is of great magnitude. In fact, the basic fundamentals and operational principles and limitations of accelerators and curing agents for the vulcanization of rubber are so well known by those skilled in the art that further eludication thereof and elaboration thereon is unnecessary for understanding of the advance possibilated by and with the development of the present invention.

Although heretofore unknown as accelerator materials in and for rubber compositions, various amine form of esters, or amine-substituted esters, of phosphorodithioic acid, are recognized compositions of matter, as are disclosed in U.S. Pat. No. 2,586,656.

FIELD AND OBJECTIVES OF THE INVENTION

This invention pertains to particular amine-substituted esters of phosphorodithioic acid, as hereinafter more fully defined and characterized, which can be prepared by a relatively simple process using raw materials that are relatively and in good supply available and not unduly expensive and are capable of use with attendant good results for the vulcanization of compounded stocks of unsaturated, generally sulfur-vulcanizable natural or synthetic rubber and which provide inherently satisfactory cure rates in and of the rubber being treated and/or fabricated; the provision of all of same being amongst the principle aims and objectives of the invention.

SUMMARY OF THE INVENTION

The present invention and the discovery on which it is based relates to improved accelerated rubber combination compositions which are comprised of certain effective functioning amine-substituted esters of phosphorodithioic acid of the Formula (I), as is defined and more fully specified in the ensuing Specification and description. The invention also contemplates unsaturated and generally sulfur-vulcanizable natural and synthetic rubber formulations and stocks compounded with and containing the herein-contemplated essential accelerator additament of the invention; plus vulcanized rubber goods and articles that have been cured by use of the said beneficial and relatively inexpensive accelerator system. The working proportional details and other significant specifics of the invention are also set forth in the following.

PARTICULARIZED DESCRIPTION OF THE INVENTION

According to the present invention, a curing agent or accelerator for the vulcanization of natural or synthetic rubber is comprised in a novel composition, in effective minor proportion with respect to the mass of rubber being cured, of an accelerator that is an amine-substituted ester of a phosphorodithioic acid (i.e., $(HO)_2$ —P:S—SH), which ester is of the general Formula:

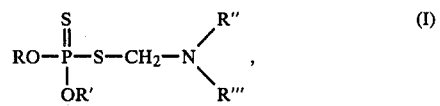

wherein R, R', R" and R'" are independently selected from the group consisting of linear, branch-structured and cyclic aliphatic radicals and/or aromatic radicals and mixtures thereof independently containing from 1 to about 12 carbon atoms and in which group, additionally, R" and R'" optionally can be independently and individually albeit not simultaneously a proton.

Typically in various embodiments of compounds of the above Formula (I), R, R', R" and R'" can independently be, as selected and desired, methyl, ethyl, n-propyl, isopropyl, n-butyl and its isomers, cyclohexyl, octyl and its isomers (such as 2-ethylhexy), stearyl, phenyl and so forth.

The phosphorodithioic acid derivative materials of the Formula (I) above are, more precisely, termed as O,O'-dihydrocarbyl-S-hydrocarbylaminomethylphosphorodithioates.

Particularly advantageous species of the amine-substituted esters of the Formula (I) for utilization in practice of the present invention (with, for convenience, each particularly exemplified species also condified and hereinafter referred to by the associated "Z-No." below given):

| "Z-No." | Species Compound |
|---------|------------------|
| "Z-11" | O,O'-diisopropyl-S-phenylaminomethylphosphorodithioate; |
| "Z-12" | O,O'-diisopropyl-S-cyclohexylaminomethylphosphorodithioate; |
| "Z-13" | O,O'-di-2-ethylhexyl-S-phenylaminomethylphosphorodithioate; |
| "Z-14" | O,O'-di-2-ethylhexyl-S-cyclohexylaminomethylphosphorodithioate; |
| "Z-15" | O,O'-di-2-ethylhexyl-S-tert.-butylaminomethylphosphorodithioate; |
| "Z-16" | N,N'-bis[O,O'-di-(2-ethylhexyl)-phosphorodithioylmethyl]hexamethylenediamine; |
| "Z-17" | O,O'-dicyclohexyl-S-phenylaminomethylphosphorodithioate; |
| "Z-18" | O,O'-dicyclohexyl-S-cyclohexylaminomethylphosphorodithioate; and |
| "Z-19" | O,O'-dicyclohexyl-S-tert.-butylaminomethylphosphorodithioate. |

The general preparation of the compounds of Formula (I) is as described in the identified U.S. Pat. No. 2,586,656.

For this, it is usual to react phosphorous pentasulfide ($P_2S_5$) with a suitable alcohol (ROH) and then subsequently to react the O,O'-dihydrocarbylphosphorodithioic acid with aqueous formaldehyde and a mole (equivalent) of an amine. The involved chemical reactions may be illustrated as follows:

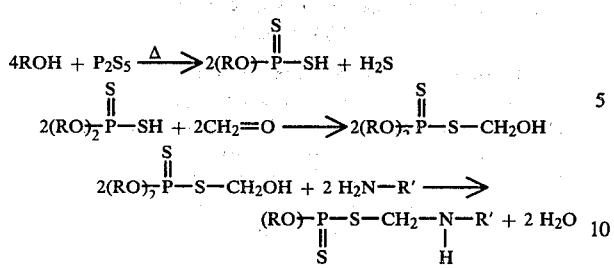

$$4ROH + P_2S_5 \xrightarrow{\Delta} 2(RO)_2\!\!-\!\!\overset{\overset{S}{\|}}{P}\!\!-\!\!SH + H_2S$$

$$2(RO)_2\!\!-\!\!\overset{\overset{S}{\|}}{P}\!\!-\!\!SH + 2CH_2\!=\!O \longrightarrow 2(RO)_2\!\!-\!\!\overset{\overset{S}{\|}}{P}\!\!-\!\!S\!\!-\!\!CH_2OH$$

$$2(RO)_2\!\!-\!\!\overset{\overset{S}{\|}}{P}\!\!-\!\!S\!\!-\!\!CH_2OH + 2\,H_2N\!\!-\!\!R' \longrightarrow$$
$$(RO)_2\!\!-\!\!\underset{\underset{S}{\|}}{\overset{\overset{}{}}{P}}\!\!-\!\!S\!\!-\!\!CH_2\!\!-\!\!\underset{\underset{H}{|}}{N}\!\!-\!\!R' + 2\,H_2O$$

Of course, several conventional and easily determinable recovery methods are applicable for isolation of the desired accelerator additive product.

As is readily comprehended by those skilled in the art, the optimum particular respective proportions and measures to utilize for curing any given rubber system to be vulcanized depends in great measure on the specific utilized compounds (or mixtures thereof) of the Formula (I)—including possible mixtures therewith of either suitable accelerator and the like compounds—that are utilized and the specific rubber stock being compounded and vulcanized. In any event, the most satisfactory and effective amounts of the accelerator additive compound to incorporate for compounding in the rubber mass or stock to be vulcanized can be readily determined by simple and straightforward testing for any given embodiments desired to be utilized.

Nonetheless, it is frequently advantageous to observe the following recipe parameters insofar as actual accelerator content is concerned, with all numerically indicated concentration values being based and only approximately quantified on either parts by weight of the curing agent component per hundred parts by weight of rubber mass in the admixed and compounded vulcanizable stock (i.e., "phr") or on total charged moles of combined accelerator taken as molar concentration in gram (or other weight part) moles per hundred (100) grams (or other weight units) of rubber. Along this line, molar concentration is literally generally a more directly recognizable indication of accelerator effectiveness which is directly dependent on the functional capability of the quantity of the additive concentrated in the mass.

| Accelerator Concentration | Broad, Generally Functional Range | Sometimes Preferred Range |
|---|---|---|
| In phr | 0.10–10.0 | 1.5–5.5 |
| Molar | 0.001–0.020 | 0.005–0.010 |

Oftentimes, less of any particular given lower molecular weight species of the accelerator components possible to employ is required in comparison to the gravimetric requirements involved when higher molecular weight materials are utilized.

The accelerator additive composition of the present invention is handled, mixed into by compounding and treated or processed for curing and vulcanization of the rubber stock in standard and well known ways following conventional means and procedures for the operation. Of course, other conventional ingredients, including especially sulfur or the like or equivalent, can be incorporated in the stock being compounded, all as desired and/or required in and for any given instance.

The rubber to be cured and vulcanized by practice of the present invention for making the cured rubber product for use in tire manufacture and for other rubber product purposes may be natural rubber (otherwise known as Hevea Brasiliensis) or conjugated diolefine polymer synthetic rubber or mixtures of any of them including their reclaims used at least partially for the stock being worked.

Such conjugated diolefine polymer synthetic rubbers are polymers of butadienes-1,3, e.g., butadiene-1,3, isoprene, 2,3-dimethylbutadiene-1,3, and copolymers of mixtures thereof, and copolymers of mixtures of one or more such butadienes-1,3, for example, up to 75 percent by weight of such mixture of one or more monoethylenic compounds which contain a $CH_2=C<$ group, wherein at least one of the disconnected valences is attached to an electronegative group, that is, a group which substantially increases the electrical dissymmetry or polar character of the molecule.

Examples of compounds which contain a $CH_2=<$ group and are copolymerizable with butadienes-1,3 are: aryl olefines, such as styrene, vinyl toluene, alpha-methylstyrene, chlorostyrene, dichlorostyrene, vinyl naphthalene; the unsaturated carboxylic acids and their esters, nitriles and amides, such as acrylic acid, methyl acrylate, ethyl acrylate, methyl methacrylate, acrylonitrile, methacrylonitrile, methacrylamide; vinylpyridines, such as 2-vinylpyridine, 2-methyl-5-vinylpyridine; methyl vinyl ketone, and methyl isopropenyl ketone.

Examples of such conjugated diolefine polymer synthetic rubbers are polybutadiene, polyisoprene, butadiene/styrene copolymers (i.e., "SBR") and butadiene/acrylonitrile copolymers. The synthetic rubber may be solution-prepared or emulsion-prepared, be it a sterospecific variety or otherwise.

Other conventional unsaturated sulfur-vulcanizable rubbers may be used, such as "EPDM" (rubbery terpolymer of ethylene, propylene and a copolymerizable non-conjugated diene such as 1,4-hexadiene, dicyclopentadiene, dicyclooctadine, methylenenorbornene, ethylidenenorbornene, tetrahydroindene, etc.). The analogous fluorocarbon, silicone and polysulfide rubbers may also be employed.

The rubber stock to be compounded and vulcanized, as has been mentioned, can also and as is needed contain conventional compounding and vulcanizing ingredients such as carbon black, rubber processing or softening oils (which may be added as such or as may be present from oil-extended rubbers), antioxidants, sulfur, zinc oxide and so forth.

EXEMPLIFICATION OF THE INVENTION

To demonstrate the advantageous practice of the present invention, a number of samples of a common and widely commercially employed oil-extended SBR stock were compounded and tested with various accelerator additives in accordance with the present invention to determine their individual vulcanization rate characteristics. Each of the samples investigated was prepared according to a standard recipe or base compound formulation which was (with all parts therein taken by weight):

| Ingredient | Parts |
|---|---|
| Oil-Extended SBR | 145 (Containing 45 parts Mineral Oil) |
| Carbon Black | 70 |
| Stearic Acid | 2 |
| Zinc Oxide | 2 |
| Stabilizer (Antioxidant) | 1.0 |
| Sulfur | 1.7 |
| Total Accelerator | Variable (as shown) |

The method used to prove efficacy of the accelerator additive was to first determine an appropriate Cure Time to obtain optimum rate of vulcanization for each sample.

In this connection and as is comprehended by those skilled in the art, the Cure Time (or $T_c$) for any given sample is involved in its Cure Rate Index (i.e., "CRI"). CRI is defined as $1//(T_c-T_s)\times 100$, or the reciprocal of the difference between $T_c$ (which is the time necessary to achieve a 90 percent cure) and $T_s$ (time to scorch, that is, the time taken to achieve a two-torque unit use) multiplied by 100. A MONSANTO Rheometer is used in these laterally standard tests; with specific conditions employed being: operation at 100 rpm; use of the mini-die attachment in the apparatus; and the effecting of a one degree arc at 149° C. during the test procedure.

The reasons for use of the indicated test, as is well known, are plain and fundamentally sound. Rheometer data are based on torque measurements. These, including significant maximum torque measures, are indicative at any given point of measure of the state of cure of the vulcanizing sample. The time required to increase the torque is reliably indicative of the particularly involved rate of the vulcanization reaction. The involved units of torque are generally expressed in Neuton meters, $(N \cdot m)_x$. The scorch and cure times are generally expressed in minutes.

The basic MONSANTO Rheometer data obtained with Compounds "Z-11" through "Z-17", inclusive, are related in the following TABLE I.

TABLE I

| MONSANTO RHEOMETER RESULTS | | | | |
|---|---|---|---|---|
| Base Compound Plus: | Minutes to $T_s$ | Minutes to $T_c$ | Torque, Maximum $(N \cdot m)_x$ | CRI |
| 1.9 phr "Z-11" | 21.8 | 53.6 | 2.45 | 3.1 |
| 3.8 phr "Z-11" | 10.7 | 42.6 | 3.21 | 3.1 |
| 1.9 phr "Z-12" | 6.3 | 25.3 | 3.31 | 5.3 |
| 3.8 phr "Z-12" | 3.3 | 12.6 | 3.58 | 10.8 |
| 2.7 phr "Z-13" | 21.5 | 52.7 | 2.28 | 3.2 |
| 5.4 phr "Z-13" | 10.1 | 44.0 | 2.82 | 2.9 |
| 2.8 phr "Z-14" | 5.6 | 18.7 | 3.52 | 7.6 |
| 5.5 phr "Z-14" | 3.3 | 9.9 | 3.79 | 15.2 |
| 2.6 phr "Z-15" | 9.1 | 32.3 | 3.40 | 4.3 |
| 5.2 phr "Z-15" | 4.7 | 13.3 | 3.70 | 11.6 |
| 5.0 phr "Z-16" | 2.5 | 9.6 | 3.74 | 14.1 |
| 10.0 phr "Z-16" | 1.3 | 6.5 | 3.91 | 19.2 |
| 2.4 phr "Z-17" | 22.7 | 59.6 | 2.78 | 2.7 |
| 4.7 phr "Z-17" | 15.0 | 51.0 | 3.05 | 2.8 |

The tabulated data plainly indicate that the amine-substituted phosphorodithioic acid ester vulcanization accelerators pursuant to the present invention impart good scorch resistant properties as well as reasonably attractive cure rates to the compounded rubber stock materials in which they are incorporated.

After Cure time (i.e., practical $T_c$) determination, each given sample composition was vulcanized over suitable time ranges. The vulcanized sample specimens were then tested by standard and well known procedures for their obtained values of: (i) 300% Modulus; (ii) Tensile Strength; and (iii) percentage Elongation in order to find and fix the conventionally sought Stress/Strain data applicable to each. These data, insofar as force measurements were and are involved, were actually taken (with the appropriate test apparatus commonly employed for the purpose) in the English System of pounds-force/inch² (i.e., "psi"). For convenience, the Metric System equivalents in megapascals (i.e., "MPa") are also reproduced with the herein-included data. In this, MPa values are simply and straightforwardly obtained upon multiplication of any psi value by the numerical conversion factor 0.006894757. Generally, to accommodate involved practicalities of the testing precision, the so-converted psi values are rounded off to the nearest unit of tenths, 0.1, in MPa value as, for example, giving a value of 6.9 MPa for the equivalent of 1,000 psi since the actually calculable numerical equivalent obtainable using the given multiplication factor is 6.894757.

The specific testing results obtained with Compounds "Z-11" through "Z-16", inclusive, are set forth in the following second tabulation:

TABLE II

| Compound No. | phr | Cure Time, Minutes | 300% Modulus | | Tensile Strength | | Elongation, % |
|---|---|---|---|---|---|---|---|
| | | | psi | MPa | psi | MPa | |
| "Z-11" | 1.9 | 45 | 267 | 1.8 | 1301 | 9.0 | 967 |
| | | 50 | 333 | 2.3 | 1723 | 11.9 | 927 |
| | | 55 | 331 | 2.3 | 1771 | 12.2 | 897 |
| | 3.8 | 40 | 506 | 3.5 | 2547 | 17.6 | 863 |
| | | 45 | 538 | 3.7 | 2612 | 18.0 | 837 |
| | | 50 | 568 | 3.9 | 2453 | 16.9 | 790 |
| "Z-12" | 1.9 | 20 | 622 | 4.3 | 2619 | 18.1 | 770 |
| | | 25 | 697 | 4.8 | 2647 | 18.3 | 727 |
| | | 30 | 745 | 5.2 | 2789 | 19.2 | 713 |
| | 3.8 | 15 | 1045 | 7.2 | 3007 | 20.7 | 620 |
| | | 20 | 991 | 6.8 | 2837 | 19.6 | 623 |
| | | 25 | 1087 | 7.5 | 2929 | 20.2 | 607 |
| "Z-13" | 2.7 | 50 | 354 | 2.4 | 1944 | 13.4 | 917 |
| | | 55 | 332 | 2.3 | 1822 | 12.6 | 937 |
| | | 60 | 356 | 2.5 | 1862 | 12.8 | 910 |
| | 5.4 | 40 | 517 | 3.6 | 2465 | 17.0 | 840 |
| | | 45 | 538 | 3.7 | 2656 | 18.3 | 850 |
| | | 50 | 563 | 3.9 | 2577 | 17.8 | 820 |
| "Z-14" | 2.8 | 15 | 797 | 5.5 | 2773 | 19.1 | 687 |
| | | 20 | 859 | 5.9 | 2814 | 19.4 | 663 |
| | | 25 | 899 | 6.2 | 2830 | 19.5 | 647 |
| | 5.5 | 10 | 871 | 6.0 | 2513 | 17.3 | 617 |
| | | 15 | 946 | 6.5 | 2469 | 17.0 | 587 |
| | | 20 | 947 | 6.5 | 2622 | 18. | 617 |
| "Z-15" | 2.6 | 40 | 623 | 4.3 | 2628 | 18.1 | 780 |

TABLE II-continued

| Compound No. | phr | Cure Time, Minutes | 300% Modulus psi | 300% Modulus MPa | Tensile Strength psi | Tensile Strength MPa | Elongation, % |
|---|---|---|---|---|---|---|---|
| | | 45 | 686 | 4.7 | 2704 | 18.6 | 743 |
| | | 50 | 653 | 4.5 | 2631 | 18.1 | 763 |
| | 5.2 | 15 | 993 | 6.9 | 2813 | 19.4 | 623 |
| | | 20 | 1022 | 7.1 | 2895 | 20.0 | 627 |
| | | 25 | 1026 | 7.1 | 2735 | 19.0 | 603 |
| "Z-16" | 5.0 | 10 | 892 | 6.2 | 2622 | 18.1 | 653 |
| | | 15 | 907 | 6.3 | 2773 | 19.1 | 667 |
| | | 20 | 941 | 6.5 | 2591 | 18.0 | 627 |
| | 10.0 | 10 | 1244 | 8.6 | 2091 | 14.1 | 443 |
| | | 15 | 1200 | 8.2 | 2330 | 16.1 | 503 |
| | | 20 | 1327 | 9.2 | 1819 | 12.5 | 377 |

The same tests, run with Compounds, "Z-17", "Z-18" and "Z-19" used as accelerator additives in about the same concentrations and with equivalent Cure Times as those above given for Compounds "Z-11" through "Z-16", inclusive, gave about the same comparable levels of Stress/Strain data results.

All of these results, by the way, compare favorably with those obtainable using standard accelerator additives for rubber(s). This includes such of those as the common modern day material known and obtainable as "Santocure NS" (commercially available under the indicated trade-designation from MONSANTO COMPANY of St. Louis, Mo. and which is N-tert.butylbenzo—thiazolesulfenamide). Obviously, this is an exceptionally attractive and commendable feature and incentive for practice of the present invention giving fair regard and consideration to the relative economies involved and achievable with use of the presently contemplated accelerator additives.

Similar good results are obtainable with the same and other vulcanizable natural and synthetic rubbers using different species and concentrations of accelerator materials possible to employ within the scope of the invention according to the Formula (I).

Many changes and modifications can readily be made and adapted in embodiments in accordance with the present invention without substantially departing from its apparent and intended spirit and scope, all in pursuance and accordance with same as it is set forth and defind in the hereto appended claims.

What is claimed is:

1. Vulcanizable rubber stock compounded so as to contain and be comprised of an effective minor proportion of an accelerator additive that is an amine-substituted ester of phosphorodithioic acid and which is of the Formula:

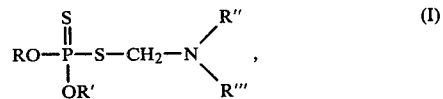

wherein R, R', R" and R'" are independently selected from the group consisting of linear, branch-structured, cyclic aliphatic and aromatic radicals and mixtures thereof independently containing from 1 to about 12 carbon atoms and in which group, additionally, R" and R'" optionally can be individually albeit not simultaneously a proton.

2. A compounded rubber stock according to that of claim 1, wherein there is therein contained, on a gram mole basis, between about 0.001 and about 0.020 moles of said compound(s) of the Formula (I) per each hundred grams of rubber in said compounded rubber product.

3. A compounded rubber stock according to that of claim 1, wherein there is therein contained, on a gram mole basis, between about 0.005 and about 0.010 moles of said compound(s) of the Formula (I) per each hundred grams of rubber in said compounded rubber product.

4. A compounded rubber stock according to that of claim 1, wherein the accelerator additive of the Formula (i) is O,O'-diisopropyl-S-phenylaminomethylphosphorodithioate.

5. A compounded rubber stock according to that of claim 1, wherein the accelerator additive of the Formula (I) is O,O'-diisopropyl-S-cyclohexylaminomethylphosphorodithioate.

6. A compounded rubber stock according to that of claim 1, wherein the accelerator additive of the Formula (i) is O,O'-di-2-ethylhexyl-S-phenylaminomethylphosphorodithioate.

7. A compounded rubber stock according to that of claim 1, wherein the accelerator additive of the Formula (i) is O,O'-di-2-ethylhexyl-S-cyclohexylaminomethylphosphorodithioate.

8. A compounded rubber stock according to that of claim 1, wherein the accelerator additive of the Formula (I) is O,O'-di-2-ethylhexyl-S-tert.-butylaminomethylphosphorodithioate.

9. A compounded rubber stock according to that of claim 1, wherein the accelerator additive of the Formula (i) is N,N'-bis[O,O'-di-(2-ethylhexyl)-phosphorodithioylmethyl]hexamethylenediamine.

10. A compounded rubber stock according to that of claim 1, wherein the accelerator additive of the Formula (I) is O,O'-dicylcohexyl-S-phenylaminomethylphosphorodithioate.

11. A compounded rubber stock according to that of claim 1, wherein the accelerator additive of the Formula (I) is O,O'-dicyclohexyl-S-cyclohexylaminomethylphosphorodithioate.

12. A compounded rubber stock according to that of claim 1, wherein the accelerator additive of the Formula (I) is O,O'-dicyclohexyl-S-tert.-butylaminomethylphosphorodithioate.

13. A compounded rubber stock according to that of claim 1, wherein sulfur is present in a functionally adequate amount in the compounded stock for vulcanization upon curing of the rubber.

* * * * *